United States Patent [19]
>
> Sanderson

[11] 4,163,610

[45] Aug. 7, 1979

[54] REAR/REMOTE-SCREEN PROJECTOR

[75] Inventor: William R. Sanderson, Rochester, N.Y.

[73] Assignee: The Singer Company, New York, N.Y.

[21] Appl. No.: 961,304

[22] Filed: Nov. 16, 1978

[51] Int. Cl.² ............................................. G03B 21/22
[52] U.S. Cl. ........................................ 353/71; 353/78
[58] Field of Search ......................... 353/71, 72, 77, 78

[56] References Cited

U.S. PATENT DOCUMENTS

| | | | |
|---|---|---|---|
| 3,387,535 | 6/1968 | Bennett | 353/71 |
| 3,856,391 | 12/1974 | Hickey et al. | 353/88 |
| 4,003,644 | 1/1977 | Arvanno | 353/71 X |
| 4,030,821 | 6/1977 | Badalich | 353/71 |

*Primary Examiner*—Harry N. Haroian
*Attorney, Agent, or Firm*—Edward W. Goodman; Charles R. Lewis

[57] ABSTRACT

A rear/remote-screen projector includes means for alternatively projecting slide images on a remote screen or on a rear screen mounted on the projection housing. The opening of a door in the housing laterally shifts one of the mirrors in the housing without changing the angular orientation thereof thereby allowing the projected image, previously reflected by this mirror to other mirrors and eventually to the integral rear-screen, to pass through the door opening and to a remote screen.

6 Claims, 4 Drawing Figures

FIG. IA.
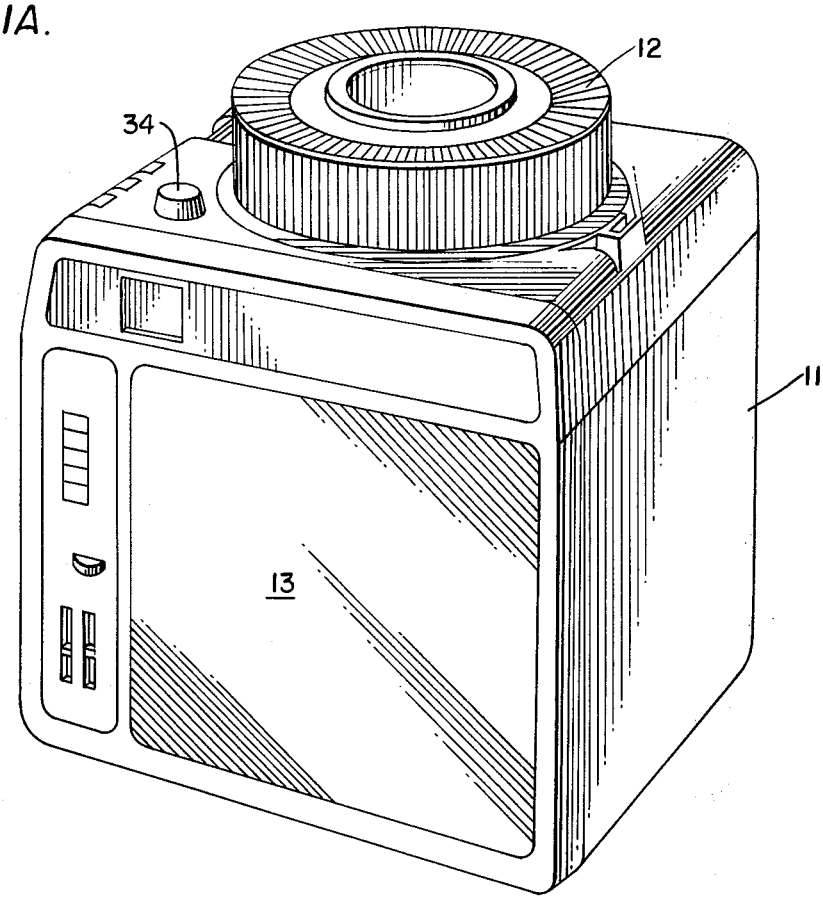
FIG. IB.
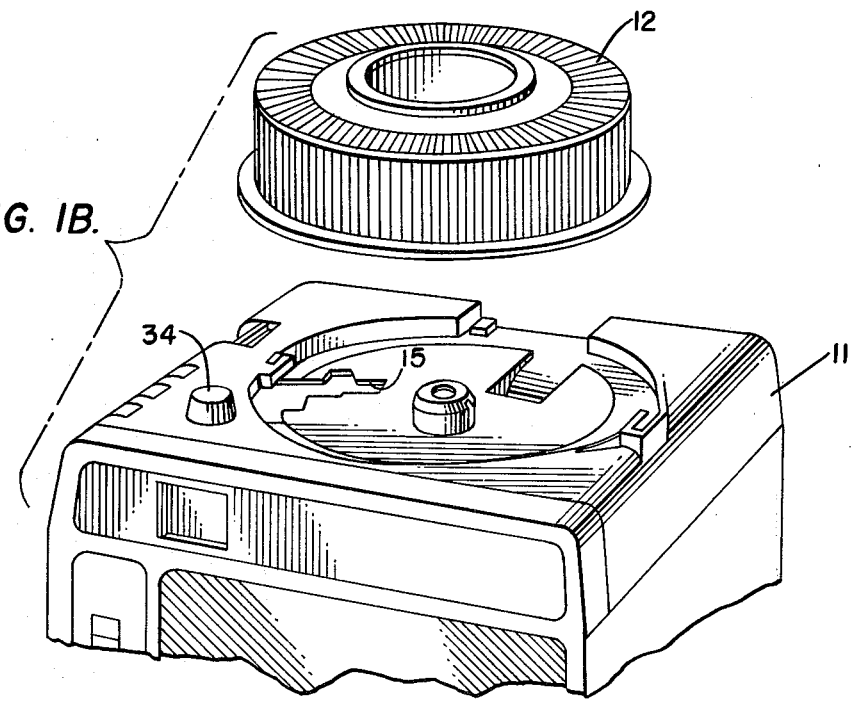

REAR/REMOTE-SCREEN PROJECTOR

DESCRIPTION

BACKGROUND OF THE INVENTION

This invention relates to rear/remote-screen projectors and more particularly to those projectors capable of changing from one mode of operation to the other without changing the angular orientation of any of the mirrors therein.

A rear-screen slide projector is a useful device especially when showing slides to a small group in a confined area. However, it is also desirable, space permitting, to project the slide images onto a remote screen such that a much larger display is obtained. U.S. Pat. No. 4,030,821 of Badalich discloses a rear/remote-screen slide projector which may, in the alternative, project a slide image on a remote screen. This is accomplished through use of a pivoting door in the projector housing which, when opened, pivots one of the mirrors and the focusing lens vertically located inside the housing, such that the mirror is out of the optical path and the lens is horizontal for use in focusing the image projected onto the remote screen by way of this open door. Although this arrangement works satisfactorily, it involves the use of intricate linkages which are costly to manufacture. Also the pivoting of both the mirror and the lens changes the angular orientations thereof and brings up the need for precise stops to assure proper positioning of the mirror and lens.

SUMMARY OF THE INVENTION

The object of this invention is to provide a rear/remote-screen slide projector which is capable of romote screen projection without changing the angular orientation of any of the mirrors therein. Another object of this invention is to provide for remote screen projection without shifting the focusing lens in the projector while changing between rear-screen and remote-screen projection.

A further object of this invention is to provide for remote screen projection wherein the manufacturing thereof may be performed economically.

These objects are achieved in a rear/remote-screen projector having a housing, means within the housing for handling slides, means within the housing for projecting light through the slides along an optical path, a projection screen mounted in one face of the housing, at least one mirror located within the housing for folding the optical path or projecting the slide images onto the projection screen, a laterally shiftable frame mounted in the housing having one of the mirrors attached thereto in its proper orientation, the frame having an aperture formed therein adjacent to the mirror and having a first position in which the mirror is in registry with the optical path and a second position in which the aperture is in registry with the optical path, and the housing being formed with an aperture therein which, when the frame is in its second position, is coaxial with the frame aperture.

DESCRIPTION OF THE DRAWINGS

With the above and additional objects and advantages in mind as will hereinafter appear, this invention will be described with reference to the drawings of the preferred embodiment in which:

FIG. 1A is a front perspective view of a rear/remote-screen projector having the invention incorporated therein;

FIG. 1B is a perspective view of the rear/remote-screen projector of FIG. 1A with the slide tray separated from the housing;

DESCRIPTION OF THE PREFERRED EMBODIMENT

Figure 2:
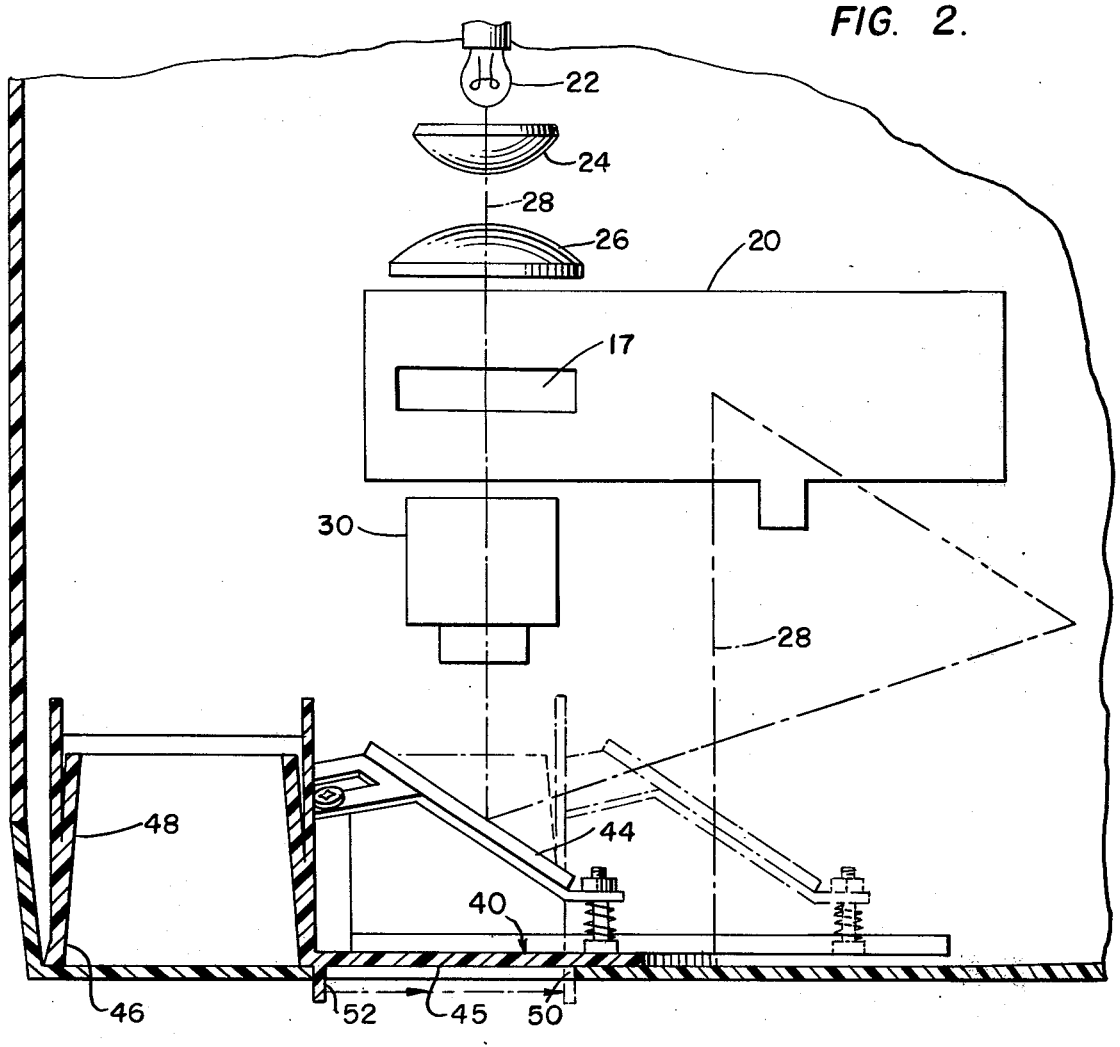
FIG. 2 is a partial top plan view of the rear/remote-screen projector with the top cover removed.

Apparatus which may utilize the present invention is shown in FIG. 1A as comprising a rear/remote-screen projector having a housing 11 in the general shape of a cube. A gravity feed slide tray 12 is removably mounted on the top of the rear/remote-screen housing 11. Located within the housing 11 beneath the slide tray 12 is a slide tray and slide positioning mechanism (see FIG. 2). The slide projector projects the image of successive slides in the slide tray 12 onto the rear of a viewing screen 13 contained in the front of the rear/remote-screen projector housing 11. Since the screen 13 is located near the image being being projected, it is necessary that the path 28 of the projected image be folded one or more times before being displayed on the screen 13. This is accomplished by the use of one or more mirrors within the housing 11 in a well known manner. This enables a much larger image to be obtained on the viewing screen 13 than could be obtained within the confines of the projector housing 11 without folding the optical path of the projected image.

The gravity feed slide tray 12 and the cooperative relationship between the slide tray 12 and the top of the rear/remote-screen projector housing 11 is substantially identical to that described in U.S. Pat. No. 3,276,156 of Robinson, the disclosure of which is incorporated herein by reference. The slide tray 12 contains an annular disc (not shown) on the bottom thereof having an opening therein through which successive slides contained in the slide tray 12 may pass. As shown in FIG. 1B, an opening 15 in the top of the rear/remote-screen housing 11 is located above a projector gate 17 within the rear/remote-screen housing 11 and below the opening in the slide tray 12. When indexed, successive slides in the slide tray 12 are positioned over the opening in the slide tray 12 which is located over the opening 15 in the rear/remote-screen housing 11 such that the successive slides are lowered into the projector gate 17 and projected onto the screen 13 of the rear/remote-screen projector and then placed back into the slide tray 12.

Referring to FIG. 2, the projector gate 17 is found in the slide tray and slide positioning mechanism which is illustrated as including an elongated rectangular housing 20 which may be secured together by any number of well known means. The rectangular housing 20 is mounted to the underside of the top of the rear/remote-screen housing 11 by any number of well known means. The operation of the entire slide tray and slide positioning mechanism is described in detail in U.S. Pat. No. 3,879,112 of Hickey, the disclosure of which is also incorporated herein by reference.

An electric lamp 22 is located behind the projector gate 17 with condenser lenses 24 and 26 being located between the electric lamp 22 and the projector gate 17. Mounted in front of the projector gate 17, in line with the optical path 28 of the projector, is an objective lens barrel 30 having an adjustable focusing mechanism (not shown) attached thereto which is coupled to a focus control knob 34.

Figure 3:
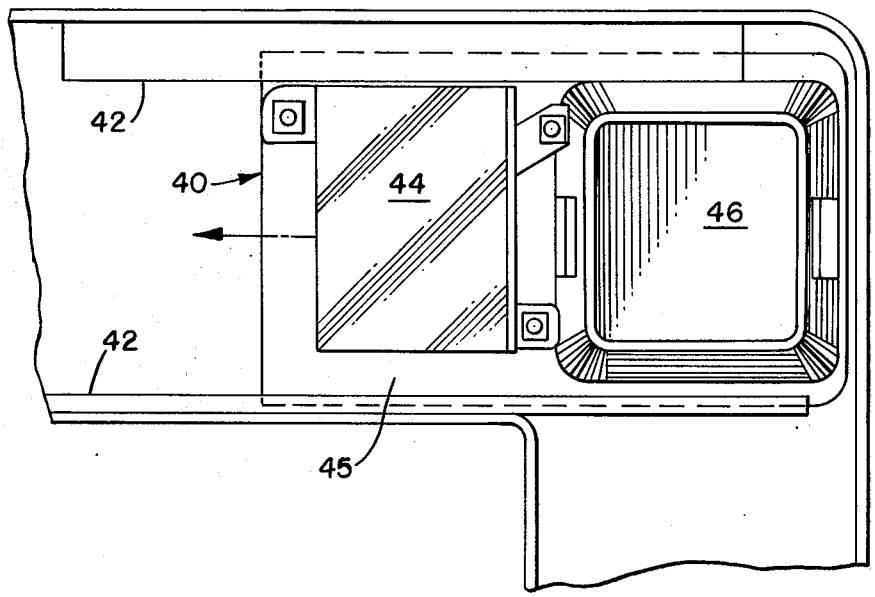
FIG. 3 is an elevational view of the inside surface of the front face of the rear/remote-screen projector showing the invention therein.

A laterally shiftable frame 40 is located in a plane normal to the optical path 28 and is mounted to the inside of the rear/remote-screen housing 11 above the viewing screen 13 by means of a pair of horizontal slide rails 42 (see FIG. 3). Located at an angle to the optical path 28 of the projector, is a mirror 44 which is secured to a section 45 of the laterally shiftable frame 40 by any number of well known means. This mirror 44 may also be adjustably mounted in a manner as described in U.S. Pat. No. 3,856,391 of Hickey, the disclosure of which is herein incorporated by reference. The laterally shiftable frame 40, which is further formed with an aperture 46 therethrough adjacent to the mirror 44, has a first position wherein the mirror 44 is along the optical path 28, in registry thereto, and a second position wherein the aperture 46 therein is in registry with the optical path 28. A shroud 48 surrounds the aperture 46 and extends inwardly from the frame 40 along the optical path 28 for channeling the projected light and for preventing exterior light from entering the projector housing 11. An aperture 50 is also formed in the housing 11 behind the shiftable frame 40 and is coaxial with the frame aperture 46 when the frame 40 is in the second position thereof. A handle 52 is attached to the frame 40 for moving the frame 40 between the first and second positions thereof and extends outwardly through the housing aperture 50. This handle 52 also acts as a stop for establishing the two aforementioned positions of the frame 40 by alternately engaging the opposite sides of the housing aperture 50. When the frame 40 is in the first position thereof, the section 45 of the frame 40, to which the mirror 44 is mounted, further serves to close the housing aperture 50 preventing extraneous light from entering the housing 11 while the projector is being used as a rear-screen projector.

In operation, with the frame 40 in the first position thereof, the image on a slide placed in the projector gate 17 is projected along the optical path 28 and is reflected by mirror 44 to the remaining mirrors inside the projector housing 11 and to the viewing screen 13. When remote-screen projection is desired the operator moves the frame 40 laterally to the second position thereof by grasping the handle 52 and shifting it to the right as viewed in FIG. 2 until the handle 52 engages the opposite side of the housing aperture 50. The shifting of the frame 40 to the second position thereof moves the mirror 44, attached to the frame 40, out of the optical path 28 and positions the frame aperture 46 coaxially with the optical path 28. The shifting of the frame 40 also moves the frame portion 45 out of blocking relation with the housing aperture 50, allowing the projected image, traveling along the optical path 28, to pass through the frame aperture 46 and the housing aperture 50 and onto a remote screen. To change back to rear-screen projection, the operator grasps the handle 52 and moves it to the left until it engages the edge of the housing aperture 50 indicating that, once again, the mirror 44 is positioned in reflective registry with the optical path 28, the frame 40 being back in the first position thereof, and the housing aperture is blocked by the frame portion 45.

Numerous alterations of the structure herein disclosed will suggest themselves to those skilled in the art. However, it is to be understood that the present disclosure relates to a preferred embodiment of the invention which is for purposes of illustration only and not to be construed as an limitation of the invention. All such modifications which do not depart from the spirit of the invention are intended to be included within the scope of the appended claims.

I claim:

1. An apparatus for the projection of images contained on slides comprising;
   a housing;
   means within said housing for handling said slides;
   means within said housing for projecting light through said slides along an optical path;
   a projection screen mounted in one face of said housing;
   at least one mirror located within said housing for folding said optical path of said apparatus for projecting said slide images on said projection screen;
   a laterally shiftable frame mounted within said housing;
   one of said mirrors mounted on said shiftable frame;
   means for moving said frame between a first position in which said one mirror is in registry with said optical path and a second position in which said one mirror is completely removed from said optical path;
   said frame extending beyond said one mirror and being formed with an aperture therethrough in a plane intersection said optical path, said aperture being located in said frame such that when said frame is in said second position said aperture is coaxial with said optical path;
   stop means in cooperation with said frame for establish said first and said second positions thereof; and
   said housing being formed with an aperture therethrough located adjacent said frame such that when said frame is in said second position said housing aperture is coaxial with said optical path, whereby said slide images may be projected onto a remote screen.

2. The apparatus as set forth in claim 1 which further comprises means for selectively closing said housing aperture whereby when said frame is in said first position extraneous light is prevented from entering said housing through said housing aperture.

3. The apparatus as set forth in claim 2 wherein said housing aperture closing means comprises the portion of said frame to which said mirrors is mounted.

4. The apparatus as set forth in claim 3 wherein said frame moving means comprises a handle attached to said frame, said handle extending outwardly from said frame through said housing aperture.

5. The apparatus as set forth in claim 4 wherein said stop means comprises said handle engaging the sides of said housing aperture.

6. The apparatus as set forth in claim 1 which further comprises a shroud fitted around said frame aperture and fixed to said frame for channeling said light projected through said slides to said housing aperture when said frame is in said second position.

* * * * *